United States Patent [19]
Azetsu et al.

[11] Patent Number: 5,373,739
[45] Date of Patent: Dec. 20, 1994

[54] ACCELERATION DETECTOR

[75] Inventors: Kayoko Azetsu, Kariya; Toshihiro Kobayashi, Nagoya; Hideo Haneda, Chiryu, all of Japan

[73] Assignee: Aisin Seiki Kabushiki Kaisha, Kariya, Japan

[21] Appl. No.: 854,871

[22] Filed: Mar. 20, 1992

[30] Foreign Application Priority Data

Mar. 22, 1991 [JP] Japan .................. 3-083497

[51] Int. Cl.$^5$ .................................... G01P 15/08
[52] U.S. Cl. .................................... 73/517 R; 338/5
[58] Field of Search .................. 73/517 R, 514; 338/2, 338/5, 46

[56] References Cited

U.S. PATENT DOCUMENTS

| | | |
|---|---|---|
| 4,808,157 | 7/1989 | Kobayashi .................. 338/5 |
| 4,809,552 | 3/1989 | Johnson .................. 338/5 |
| 4,938,065 | 7/1990 | Kobayashi .................. 73/517 R |
| 4,987,781 | 1/1991 | Reimann .................. 73/517 R |

FOREIGN PATENT DOCUMENTS

| | | | |
|---|---|---|---|
| 62-121367 | 6/1987 | Japan .................. | 73/517 R |
| 2122027 | 1/1984 | United Kingdom .................. | 338/2 |
| 2123554 | 2/1984 | United Kingdom .................. | 73/517 R |

*Primary Examiner*—Hezron E. Williams
*Assistant Examiner*—Christine K. Oda
*Attorney, Agent, or Firm*—Sughrue, Mion, Zinn, Macpeak & Seas

[57] ABSTRACT

An acceleration detector includes a beam having a strain gauge mounted thereon, an arm of synthetic resin fixed on the beam and a spherical weight fixed on the end of the arm. The weight, the arm and the beam are formed as a single unit by insert formation molding to provide a shock proof detector with good accuracy.

3 Claims, 2 Drawing Sheets

ACCELERATION DETECTOR

BACKGROUND OF THE INVENTION

This invention relates to a device for detecting acceleration, and more particularly, relates to an acceleration detector which uses a strain gauge.

A conventional acceleration detector uses a strain gauge. As shown in FIG. 4, the conventional acceleration detector has a beam 91, an arm 92 fixed to the beam 91 and a weight 93 held at one end of the arm 92. Each end of the beam 91 is supported on a support 961. The base of the arm 92 is fixed by rivets 94 to a middle part in the lengthwise direction of the beam 91. A strain gauge (not shown) is provided on the beam 91.

The arm 92 is made of an elastic material. A holder 921 is formed by bending a middle portion of the elastic material and is located at a left end portion of the arm 92. At the holder 921, the weight 93 is held. A weight stopper 95 is fixed on the support 961. The weight stopper 95 regulates a stroke of the weight 93 when over shock is added thereto.

The stroke regulation of the weight 93 is important for the acceleration detector. If the beam 91 receives a force over a surrender point of the beam 91 or the strain gauge, plastic deformation of the beam 91 or a break of the strain gauge pattern may occur resulting in the change of the character of the acceleration detector. So, the stopper 95 prevents the above problem.

It is to be noted that in FIG. 4, reference numerals "97" and "98" indicate a cover and terminals for getting an output from the strain gauge, respectively.

In the above conventional acceleration detector, the arm 92 is made of the elastic material and the weight 93 is held at the end of the arm 92. Thus, the center of gravity of the weight 93 is subject to shift in the detecting direction corresponding to the vertical direction in FIG. 4 due to the accuracy in the working of the arm 92. When the center of gravity shifts, a clearance S1 between the holder 921 and the stopper 95, and a clearance S2 between the holder 921 and a bottom surface 962 of the base 96 are changed severely.

Further, the weight 93 is formed to a rectangular shape. Thus the clearances S1 and S2 are defined by the upper surface or bottom surface of the holder 921, and touching points between the stopper 95 or the base 96 and the holder 921 are unstable upon receipt of over shock. The touching points are shifted by a twist of the beam 91 so that the clearances S1 and S2 are changed. Thus it is difficult to obtain a satisfactory clearance accuracy for each clearance, which causes a poor shock-proof device.

Further, in the conventional acceleration detector, the arm 92 is made of metal so that the weight of the arm 92 is heavy. Thus it is difficult to concentrate the center of gravity of the weight 93 at the top end of the arm 92 so that the sensitivity of the detector is poor.

Furthermore, in the conventional acceleration detector, the rectangular shape of the weight 93 increases the moment of inertia upon distortion of the beam 91. It is difficult to get high accuracy from the detector.

SUMMARY OF THE INVENTION

It is therefore, a principal object of this invention to provide an acceleration detector which is good in resisting shock and detecting accuracy.

Other and further objects of this invention will become obvious upon an understanding of the illustrative embodiments about to be described or claimed in the appended claims.

DETAILED DESCRIPTION OF THE INVENTION

Figure 1:
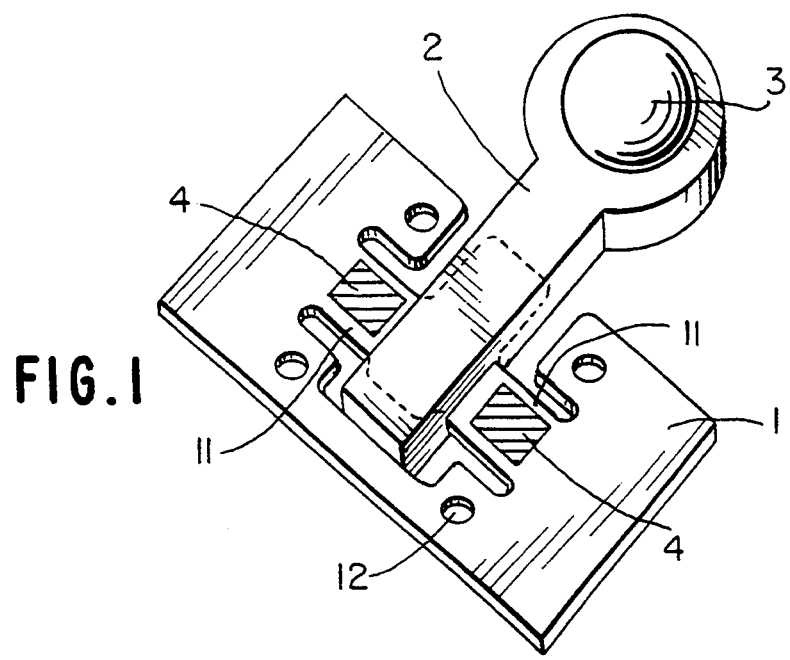
FIG. 1 is a perspective view of the main portion of an acceleration detector embodying the present invention.
Figure 2:
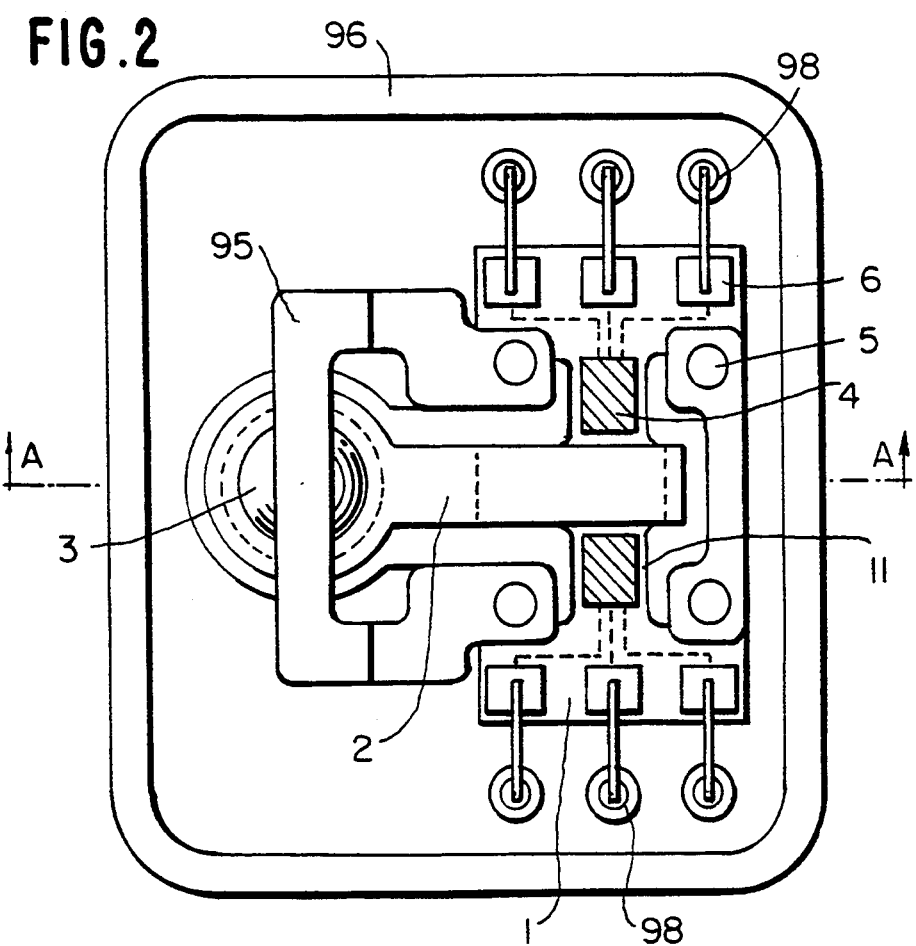
FIG. 2 is a top view of a detector in FIG. 1 wherein a cover is taken away therefrom.
Figure 3:
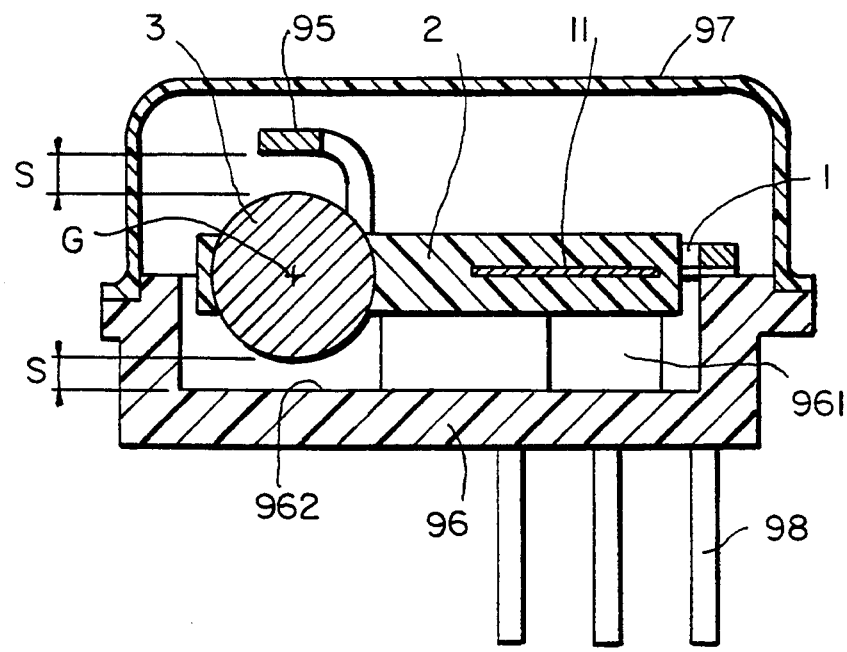
FIG. 3 is a cross-sectional view taken along line A—A in FIG. 2.
Figure 4:
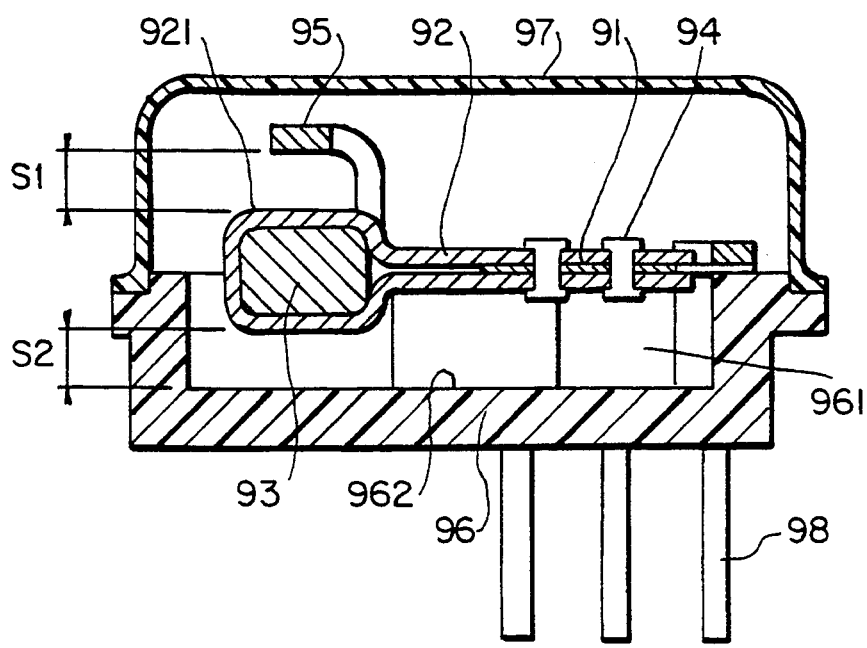
FIG. 4 is a cross-sectional view of a conventional acceleration detector.

One embodiment of this invention is illustrated in FIGS. 1 to 3. The present embodiment comprises a beam 11, an arm 2 fixed on the beam 11 and a weight 3 fixed to one end of the arm 2. A pair of strain gauges 4, 4 between which the other end of the arm 2 is located, are provided on a surface of the beam 11.

The beam 11 is formed by punching out the beam plate 1 as shown in FIGS. 1 and 2. The beam plate 1 is provided with four holes 12 for receiving therein corresponding screws 5. The beam plate 1 is fixed on the support 961 by the screws 5.

The weight 3 is made of a metal and is formed into a spherical shape. The arm 2 is formed by thermoplastic synthetic resin. Another synthetic resin is available as the raw material of the arm 2.

The arm 2, the weight 3 and the beam 11 are formed integrally with each other by an insert formation method which is well known.

In detail, as shown in FIGS. 2 and 3, the middle part of the beam 11 in the lengthwise direction is within the base of the arm 2. An axis of the arm 2 and an axis of the beam 11 are crossed and the arm 2 is perpendicular to the beam 11. Here, both ends of the beam 11 are fixed to the support 961 so that the beam 11 is established at both ends as a supported beam. The center of gravity G of the spherical weight 3 is disposed in the plane of the beam 11 as shown in FIG. 3.

On the other hand, one part of the weight 3 is within the free end of the arm 2. A diameter of the spherical weight 3 is larger than the thickness of the arm 2 so that the upper side and lower side of the weight 3 are projected from the arm 2. A predetermined clearance S is formed between the top of the weight 3 and a stopper 95 and another clearance S is formed between the bottom of the weight 3 and a surface of the base 962. The clearance S is set in consideration of over shock to the acceleration detector.

The strain gauges 4 are disposed upon the beam 11 so as to be positioned at both sides of the arm 2. Six electrodes 6 are disposed on the beam plate 1. The electrodes 6 are electrically connected with the strain gauges 4 and with terminals 98. The other part is similar to the conventional acceleration detector.

In the manufacture of the acceleration detector, first, the spherical weight 3 and beam plate 1 are set in a formation die (not shown) and an amount of liquid synthetic resin is put into the die. In this way, the weight 3, the arm 2 and the beam plate 1 are integrated into one unit by the insert formation method. Each position accuracy between any two components is decided by the die, thereby assuring an accurate relative relationship between any two components.

Next, the strain gauges 4 are fixed upon the bean 11 of the beam plate 1 as shown in FIG. 1. As shown in FIGS. 2 and 3, the beam plate I is fixed by the screws 5 to the base 96 which has been previously prepared. Simultaneously, the stopper 95 is fixed. The electrodes 6 are electrically connected with the terminals 98 by wire bonding.

In the above embodiment, each of the parts is able to be made correctly. The weight 3 is of spherical shape so that it is able to have less dimensional error. At the over shock, the weight 3 contacts the stopper 95 or the base 96 at a point. Therefore, the contact point does not shift. The accuracy of the clearance between the stopper 95 or the base 96 and weight 3 is correct and the acceleration detector has a good shock proof feature.

In the above embodiment, for the reasons that the insert formation method is used, working cost and structuring cost are decreased. Insert formation is suitable to mass production.

When the above embodiment is used, the base 96 is set vertically against the direction of the detecting acceleration. The moving direction of the weight 3 is in the same direction as the direction of the detecting acceleration. When the acceleration detector receives an acceleration, the weight 3 moves by inertia force and the beam 11 is strained. The strain is changed to a voltage by the strain gauges 4 and is output to the terminal 98.

In the above embodiment, the arm is light so that the acceleration is added to the weight 3 efficiently. The weight 3 can decrease in weight so that the acceleration detector can be small.

Since the weight 3 has a spherical shaped, the moment of inertia of the weight 3 is small around the axis of the arm 2. Therefore, it is possible to decrease the sensitivity in the non-detected direction. The detected accuracy is good.

While the invention has been particularly shown and described with reference to preferred embodiments thereof, it will be understood by those in the art that the foregoing and other changes in form and details may be made therein without departing from the spirit and scope of the invention.

What is claimed is:

1. An acceleration detector comprising:
   a beam having a strain gauge mounted thereon;
   an arm of synthetic resin material secured at one end thereof on said beam; and
   a spherical weight secured on an opposite end of the arm;
   said weight, said arm and said beam being formed integrally into one unit by insert formation molding.

2. The acceleration detector as claimed in claim 1, further comprising stopper means connected to said beam for limiting movement of said weight.

3. The acceleration detector as claimed in claim 1, wherein said spherical weight has a center of gravity located in a plane which includes said beam.

* * * * *